United States Patent
Adkins

(10) Patent No.: US 11,286,343 B2
(45) Date of Patent: Mar. 29, 2022

(54) POLYMER POLYOLS COMPRISING AMINE BASED POLYETHER POLYOLS AND A PROCESS FOR PREPARING THESE POLYMER POLYOLS

(71) Applicant: Covestro LLC, Pittsburgh, PA (US)

(72) Inventor: Rick L. Adkins, Canonsburg, PA (US)

(73) Assignee: Covestro LLC, Pittsburgh, PA (US)

( * ) Notice: Subject to any disclaimer, the term of this patent is extended or adjusted under 35 U.S.C. 154(b) by 40 days.

(21) Appl. No.: 16/941,613

(22) Filed: Jul. 29, 2020

(65) Prior Publication Data

US 2020/0354519 A1 Nov. 12, 2020

Related U.S. Application Data

(62) Division of application No. 15/406,828, filed on Jan. 16, 2017, now Pat. No. 10,767,008.

(51) Int. Cl.
| | |
|---|---|
| *C08G 65/26* | (2006.01) |
| *C08G 18/40* | (2006.01) |
| *C08G 18/08* | (2006.01) |
| *C08G 18/50* | (2006.01) |
| *C08G 18/63* | (2006.01) |
| *C08G 18/81* | (2006.01) |
| *C08G 18/76* | (2006.01) |

(52) U.S. Cl.
CPC ..... *C08G 65/2621* (2013.01); *C08G 18/0876* (2013.01); *C08G 18/409* (2013.01); *C08G 18/5024* (2013.01); *C08G 18/5051* (2013.01); *C08G 18/632* (2013.01); *C08G 18/7614* (2013.01); *C08G 18/7671* (2013.01); *C08G 18/8108* (2013.01)

(58) Field of Classification Search
CPC .............. C08G 18/0876; C08G 18/409; C08G 18/5024; C08G 18/5051; C08G 18/632; C08G 18/7614; C08G 18/7671; C08G 18/8108; C08G 65/2621
See application file for complete search history.

(56) References Cited

U.S. PATENT DOCUMENTS

| | | |
|---|---|---|
| 3,953,393 A | 4/1976 | Ramlow et al. |
| 4,119,586 A | 10/1978 | Shah |
| 4,148,840 A | 4/1979 | Shah |
| 4,286,074 A | 8/1981 | Davis et al. |
| 4,463,107 A | 7/1984 | Simroth et al. |
| 4,972,002 A | 11/1990 | Volkert |
| 5,196,476 A | 3/1993 | Simroth |
| 5,268,418 A | 12/1993 | Simroth |
| 5,324,774 A | 6/1994 | Nishikawa et al. |
| 5,364,906 A | 11/1994 | Critchfield et al. |
| 5,476,969 A | 12/1995 | Hinz et al. |
| 5,814,699 A | 9/1998 | Kratz et al. |
| 6,013,731 A | 1/2000 | Holeschovsky et al. |
| 6,624,209 B2 | 9/2003 | Kawamoto et al. |
| 6,762,274 B2 | 7/2004 | Waddington et al. |
| 7,160,975 B2 | 1/2007 | Adkins et al. |
| 7,179,882 B2 | 2/2007 | Adkins et al. |
| 7,361,695 B2 | 4/2008 | Tu et al. |
| 7,456,229 B2 | 11/2008 | Hager et al. |
| 2005/0043421 A1 | 2/2005 | Van Der Wal et al. |
| 2006/0025492 A1 | 2/2006 | Chauk |
| 2007/0254973 A1 | 11/2007 | Emge et al. |
| 2009/0281206 A1 | 11/2009 | Van der Wal et al. |
| 2014/0051779 A1* | 2/2014 | Casati ............... C08G 18/0876 521/167 |

* cited by examiner

*Primary Examiner* — John M Cooney
(74) *Attorney, Agent, or Firm* — Donald R. Palladino; N. Denise Brown

(57) ABSTRACT

This invention relates to polymer polyols which comprise one or more base polyols, at least one preformed stabilizer, one or more ethylenically unsaturated monomers, and, in the presence of at least one free radical polymerization catalyst, and optionally, one or more polymer control agents. The base polyol of these polymer polyols comprises one or more amine initiated polyols. The present invention also relates to processes for preparing these polymer polyols, to foams prepared from these polymer polyols, and to processes for producing foams from these polymer polyols.

7 Claims, No Drawings

POLYMER POLYOLS COMPRISING AMINE BASED POLYETHER POLYOLS AND A PROCESS FOR PREPARING THESE POLYMER POLYOLS

CROSS-REFERENCE TO RELATED APPLICATION:

The present application is a divisional application of U.S. application Ser. No. 15/406,828 filed on Jan. 16, 2017.

BACKGROUND OF THE INVENTION

This invention relates to polymer polyols in which the base polyol comprises an amine based polyether polyol and to a process for the production of these polymer polyols.

Various types of filled polyols are known and described in the art. Filled polyols are typically stable dispersions of solid particles in a liquid base polyol. More specifically, the known filled polyols include, for example, polyisocyanate polyaddition (i.e. PIPA) polyols, polyurea and/or polyhydrazodicarbonamide (i.e. PHD) polyols and polymer (i.e. PMPO) polyols.

The polymer polyols of the present invention offer distinct advantages that are not available from the present commercially available polymer polyols. These include a potential reduction in total volatile organic compounds (TVOC). The polyurethane foam industry is under increasing pressure to reduce volatile components in the formulations used to produce foam that can migrate out of the finished PU foam article (i.e. components such as raw material byproducts, surfactants, antioxidants, catalysts, etc.) Due to improved reactivity toward isocyanates, it may be possible to reduce the amount of volatile catalyst typically used in a polyurethane foam formulation.

SUMMARY OF THE INVENTION

This invention relates to polymer polyols in which the base polyol comprises an amine initiated polyether polyol. These comprise the free radical polymerization product of:
(a) one or more base polyols comprising at least one amine-initiated polyol wherein the amine initiator is free of tertiary amine groups and the amine initiated polyol has an equivalent weight of less than 500,
(b) one or more preformed stabilizers,
with
(c) one or more ethylenically unsaturated monomers, in the presence of
(d) one or more free-radical polymerization initiators, and, optionally,
(e) one or more polymer control agents.

The present invention also relates to processes for the production of these polymer polyols.

The process of producing these polymer polyols comprises (I) free radically polymerizing (a) one or more base polyols comprising one or more amine-initiated polyol wherein the amine initiator is free of tertiary amine groups and the amine initiated polyol has an equivalent weight of less than 500; (b) one or more preformed stabilizers; with (c) one or more ethylenically unsaturated monomers; in the presence of (d) one or more free radical initiators; and, optionally, (e) one or more polymer control agents.

Another aspect of the present invention relates to foams prepared from the above described polymer polyols. The foams comprise the reaction product of (1) a polyisocyanate component, with (2) an isocyanate-reactive component comprising the above described polymer polyols; in the presence of (3) one or more catalysts, (4) one or more blowing agents, and (5) one or more surfactants.

The present invention also relates to process for the production of foams from the above described polymer polyols. These processes comprise reacting (1) a polyisocyanate component, with (2) an isocyanate-reactive component comprising the above described polymer polyols; in the presence of (3) one or more catalysts, (4) one or more blowing agents, and (5) one or more surfactants.

DETAILED DESCRIPTION OF THE INVENTION

As used herein, the following terms shall have the following meanings.

The term pre-formed stabilizer is defined as an intermediate obtained by reacting a macromer containing reactive unsaturation (e.g. acrylate, methacrylate, maleate, etc.) with monomers (i.e. acrylonitrile, styrene, methyl methacrylate, etc.), optionally in a diluent or a solvent (i.e. methanol, isopropanol, toluene, ethylbenzene, polyether polyols, etc.) to give a co-polymer (dispersion having e.g. a low solids content (e.g. <25%), or soluble grafts, etc.).

The term "monomer" means the simple unpolymerized form of chemical compound having relatively low molecular weight, e.g., acrylonitrile, styrene, methyl methacrylate, and the like.

The phrase "free radically polymerizable ethylenically unsaturated monomer" means a monomer containing ethylenic unsaturation ($>C=C<$, i.e. two double bonded carbon atoms) that is capable of undergoing free radically induced addition polymerization reactions.

The term "stability" means the ability of a material to maintain a stable form such as the ability to stay in solution or in suspension.

The phrase "polymer polyol" refers to such compositions which are produced by polymerizing one or more ethylenically unsaturated monomers dissolved or dispersed in a polyol in the presence of a free radical catalyst to form a stable dispersion of polymer particles in the polyol. These polymer polyols have the valuable property of imparting to, for example, polyurethane foams and elastomers produced therefrom, higher load-bearing properties than are provided by the corresponding unmodified polyols.

As used herein "viscosity" is in millipascals-seconds (mPa.s) measured at 25° C. on an Anton-Paar Stabinger viscometer.

Suitable base polyols (a) include, for example, one or more amine-initiated polyether polyols. Suitable amine-initiated polyether polyols include those polyols which have a functionality of at least about 2, or of at least about 3. The functionality of suitable amine-initiated polyether polyols is typically less than or equal to about 8, or less than or equal to about 7. The suitable polyether polyols may also have functionalities ranging between any combination of these upper and lower values, inclusive, such as, from at least about 2 to about 8 or less, or from at least about 3 to about 7 or less. The suitable amine-initiated polyether polyols have equivalent weights of greater than about 55, or greater than about 75. Amine-initiated polyether polyols also typically have equivalent weights of less than 500, or of less than about 400. The suitable amine-initiated polyether polyols may also have equivalent weights ranging between any combination of these upper and lower values, inclusive, such as, for example, of from at least about 55 to less than 500, or from at least about 75 to about 400 or less.

Suitable amine-initiated polyether polyols are prepared by alkoxylation of an amine starter with an alkylene oxide, optionally in the presence of a catalyst. Amine starters for the amine-initiated polyether polyols herein typically contain primary and/or secondary amine groups and are free of tertiary amine groups.

Examples of suitable amine groups containing compounds to be used as amine starters herein include, but are not limited to, any amine group containing compound that is free of tertiary amine groups but contains at least one primary or secondary amine group. Such compounds may also contain one or more hydroxyl groups to ensure that the overall functionality of the amine initiated polyether polyols disclosed herein is satisfied. Some examples of suitable aromatic amines to be used as starters herein include compounds such as crude toluene diamine obtained by the nitration of toluene followed by reduction, 2,3-toluene diamine, 3,4-toluene diamine, 2,4-toluene diamine, and 2,6-toluene diamine or mixtures thereof, aniline, 4,4'-methylene dianiline, methylene-bridged polyphenyl polyamines composed of isomers of methylene dianilines and triamines or polyamines of higher molecular weight prepared by reacting aniline with formaldehyde by methods known in the art, ammonia, alkanol amines such as monoethanol amine, diethanolamine, organic amines such as methyl amine, ethylene diamine, diethylene triamine and the like, and Mannich reaction products of phenol or substituted phenols with alkanol amines and formaldehyde or paraformaldehyde. Mixture of the above amines may also be used. Aliphatic amines or mixtures of aliphatic amines are preferred. Examples of these aliphatic amines are monoethanolamine, diethanolamine, methyl amine, ethylene diamine, diethylene triamine, etc.

Examples of alkylene oxides useful in producing the amine-initiated polyether polyols include: ethylene oxide, propylene oxide, butylene oxide, and mixtures of these alkylene oxides. The alkylene oxides may be added as mixtures or added sequentially to produce block copolymers. When used in a mixture, ethylene oxide can be added into the backbone (i.e. polyol is terminated with propylene oxide) or can be added to give an ethylene oxide cap.

In principle, any alkaline material capable of catalyzing the epoxidation reaction of the present invention may be used. Specific alkaline catalysts which have been found to be particularly suitable include potassium hydroxide, cesium hydroxide and sodium hydroxide.

As is known in the art, the epoxidation reaction typically occurs by contacting the amine starter with the alkylene oxide(s) at an elevated temperature in the range of from 90 to 180° C., under moderately elevated pressure in the presence of the alkaline catalyst. In some embodiments, after about 5 to 30% of the total alkylene oxide to be added is contacted with an amine starter and allowed to react, then from about 0.001 to 0.1 weight percent of the catalyst, based on the weight of the finished polyol, is added to the epoxidizing mixture, and finally, the remaining amount of alkylene oxide is added to complete the epoxidation of the polyol.

In one embodiment, the amine initiated base polyol component is used in combination with a conventional base polyol component to form the polymer polyols herein. Suitable conventional base polyol components include those hydroxyl initiated base polyols which have a functionality ranging from about 2 to about 8, an OH number of from about 10 to about 1000, and are selected from the group consisting of polyether polyols, polyester polyols, polyetherester polyols, polycarbonate polyols and mixtures thereof.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH=(56.1\times 1000\times f)/\text{mol. wt.}$$

wherein:
OH: represents the hydroxyl number of the polyol,
f: represents the functionality of the polyol, i.e. the average number of hydroxyl groups per molecule of polyol,
and
mol. wt. represents the molecular weight of the polyol.

When blends of polyols are used as the base polyol herein, these polyol blends should satisfy the above described equivalent weight ranges for the amine initiated polyol component. Thus, blends of polyols used as the base polyols should have an equivalent weight in the range of greater than about 55, or of greater than about 75. The polyol blends should also have an equivalent weight range of less than about 500, or of less than about 400. Suitable polyol blends for the base polyol component should have an equivalent weight in the range of from greater than about 55 to less than 500, or of from greater than about 75 to less than about 400.

Suitable preformed stabilizers for the present invention are those preformed stabilizers which are known in the art and include without limitation those described in the references discussed herein. Preferred preformed stabilizers include those discussed in, for example, U.S. Pat. Nos. 4,148,840 (Shah), 5,196,476 (Simroth), 5,268,418 (Simroth), 5,364,906 (Critchfield) and 6,013,731 (Holeschovsky et al), the disclosures of which are hereby incorporated by reference.

In accordance with the present invention, the amount of preformed stabilizer (b) in the present invention is typically at least about 0.25%, or at least about 2%, or at least about 4%, or at least about 5% by weight, based on the total weight of the polymer polyol. It is also typical to use the preformed stabilizer (b) in accordance in the present invention in amounts of 35% by weight or less, or 32% by weight or less, or 27% by weight of less, or 22% by weight or less, based on the total weight of the polymer polyol. The amount of preformed stabilizer in the polymer polyols of the present invention may range from any combination of these upper and lower values, inclusive, e.g. from 0.25% to 35%, or from 2% to 32%, or from 4% to 27% or from 5% to 22% by weight, based on the total weight of the polymer polyol.

Suitable compounds to be used as the ethylenically unsaturated monomers, i.e. component (c) the present invention, include, for example, those ethylenically unsaturated monomers described above with respect to the preformed stabilizer. Suitable monomers include, for example, styrene monomer, acrylonitrile, methacrylate, methyl methacrylate, preferably acrylonitrile and styrene monomer, with styrene monomer being particularly preferred. Other monomers include, for example, aliphatic conjugated dienes such as isoprene, 2,4-hexadiene, etc.; monovinylidene aromatic monomers such as styrene monomer, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β- ethylenically unsaturated nitriles and amides such as acrylonitrile, methacrylonitrile, acrylamide, methacrylamide, N,N-dimethyl acrylamide, N-(dimethylaminomethyl)-acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitably employed in making the pre-formed stabilizer. Of the above monomers, the monovinylidene aromatic monomers, particularly styrene, and the ethylenically unsaturated nitriles, particularly acrylonitrile are preferred. In accordance with this aspect of the present invention, it is preferred that these ethylenically unsaturated monomers include styrene monomer and its derivatives, acrylonitrile, methyl acrylate, methyl methacrylate, vinylidene chloride, with styrene monomer and acrylonitrile being particularly preferred monomers.

It is preferred that styrene monomer and acrylonitrile are used in sufficient amounts such that the weight ratio of styrene monomer to acrylonitrile (S:AN) is from about 80:20 to 20:80, preferably from about 80:20 to 30:70, more preferably from about 75:25 to 40:60, and most preferably from about 75:25 to about 50:50. A particularly preferred weight ratio of styrene monomer to acrylonitrile is from about 70:30 to about 60:40. These ratios are suitable for polymer polyols and the processes of preparing them.

Overall, the solids content present in the polymer polyols of the present invention is greater than about 15% by weight, or at least about 20%, or at least about 30%, or at least about 40% by weight, based on the total weight of the polymer polyol. The solids content present in the polymer polyols is about 75% by weight or less, or about 70% by weight or less, or about 65% by weight or less, or about 60% by weight or less, based on the total weight of the polymer polyol. The polymer polyols of the present invention typically has a solids content ranging between any combination of these upper and lower values, inclusive, e.g. from about 15% to 75% by weight, or from about 20% to 70% by weight, or from about 30% to about 65% by weight, or from about 40% to about 60% by weight, based on the total weight of the polymer polyol.

Suitable free-radical polymerization initiators to be used as component (d) in the present invention include initiators such as, for example, peroxides including both alkyl and aryl hydroperoxides, acyl peroxides, peroxyesters, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, cumene hydroperoxide, t-butyl hydroperoxide, didecanoyl peroxide and dilauroyl peroxide, alkyl peroxides such as t-butyl peroxy-2-ethylhexanoate, t-amyl peroxy-2-ethylhexanoate, t-butyl peroxy pivalate, t-amyl peroxy pivalate, di-(2-ethyl hexyl) peroxy-dicarbonate, di-n-propyl peroxydicarbonate, di-(tertiary-amylperoxy)cyclohexane, di-sec-butyl peroxydicarbonate, 3-hydroxy-1,1-dimethylbutyl peroxyneodecanoate, α-cumyl peroxyneodecanoate, 3-hydroxy-1,1-dimethylbutyl peroxyneoheptanoate, α-cumyl peroxyneoheptanoate, t-amyl peroxy-neodecanoate, 2,5-dimethyl-2,5-di-(2-ethylhexanoylperoxy)hexane, diisononanoyl peroxide, didodecanoyl peroxide, dioctanoyl peroxide, succinic acid peroxide, t-amyl peroctoate, t-butyl perneodecanoate, t-butylperbenzoate and 1,1-dimethyl-3-hydroxybutyl peroxy-2-ethylhexanoate, dibenzoyl peroxide, 1,1,3,3-tetramethylbutyl peroxypivalate, di-(3,5,5-trimethylhexanoyl) peroxide, 1,1,3,3-tetramethylbutyl peroxy-2-ethylhexanoate, and azo catalysts such as azobis(isobutyronitrile), 2,2'-azo bis-(2-methoxylbutyronitrile), diethyl-2,2'-azobis(isobutyrate), and mixtures thereof. Most preferred are the acyl and peroxyester peroxides described above and the azo catalysts.

The quantity of free-radical initiator used herein is not critical and can be varied within wide limits. In general, the amount of initiator is preferably 0.05 to 2.0% by weight, more preferably 0.10 to 1.5% by weight, and most preferably 0.15 to 1.0% by weight, based on the total feed of the components. Increases in catalyst concentration result in increases in monomer conversion up to a certain point, but past this, further increases do not result in substantial increases in conversion. When a peroxide initiator is used, it is preferred that the quantity be limited to that which results in polymer polyols having good filterability without undesirable increases in the viscosity.

Polymer control agents, component (e), are optionally present in the stable, low viscosity polymer polyols herein. Suitable polymer control agents (PCA's) for the present invention include, for example, those which are known to be useful in polymer polyols and in the processes of preparing polyols such as those described in, for example, U.S. Pat. Nos. 3,953,393, 4,119,586, 4,463,107, 5,324,774, 5,814,699, 7,179,882 and 6,624,209, the disclosures of which are herein incorporated by reference. Some examples of suitable compounds to be used as polymer control agents include various mono-ols (i.e. monohydroxy alcohols), aromatic hydrocarbons, ethers, and other liquids.

Polymer control agents are also commonly referred to as reaction moderators. These are known to control the molecular weight of the polymer polyol. As long as the compound used as the polymer control agent does not adversely affect the performance of the polymer polyol, it is suitable for use in the practice of the invention. Preferred are the mono-ols because of their ease of stripping from the final polymer/polyol composition. Mixtures of one or more mono-ols may be used as polymer control agents. The choice of mono-ol is not narrowly critical. It should not form two phases at reaction conditions and should be readily stripped from the final polymer/polyol.

Suitable polymer control agents include, for example, one or more mono-ol which is typically an alcohol containing at least one carbon atom, such as methanol, ethanol, n-propanol, iso-propanol, n-butanol, sec.-butanol, t-butanol, n-pentanol, 2-pentanol, 3-pentanol, allyl alcohol, and the like, and mixtures of the same. The preferred mono-ol is isopropanol. Other known polymer control agents include compounds such as, for example, ethylbenzene and toluene. In accordance with the present invention, the most preferred polymer control agents include isopropanol, ethanol, tert-butanol, toluene, ethylbenzene, etc.

Polymer control agents can be used in substantially pure form (i.e. as commercially available) or can be recovered in crude form from the polymer polyol process and reused as-is. For instance, if the polymer control agent is isopropanol, it can be recovered from the polymer polyol process and used at any point in a subsequent product campaign in which the isopropanol is present (i.e. such as the production of PFS A and PFS B in Table 1 of U.S. Pat. No. 7,179,882, the disclosure of which is hereby incorporated by reference). The amount of crude polymer control agent in the total polymer control agent can range anywhere from 0% up to 100% by weight.

The total amount of polymer control agent (PCA) present in the polymer polyols of the present invention ranges from greater than about 3.0% to about 20% (or from 4.0 to 15%, or from 5 to 10%) by weight, based on the total weight of the polymer polyol.

The quantity of polymer control agent to be employed in the present invention is greater than about 3.0% by weight, or at least about 3.5%, or at least about 4.0%, or at least about 5.0% by weight, based on the 100% by weight of all components which comprise the polymer polyol, prior to stripping the product, (i.e. components (a), (b), (c), (d) and (e)). The quantity of total polymer control agent is also employed in amounts of less than or equal to 20% by weight, or less than or equal to about 15%, or less than or equal to 10%, or less than or equal to about 8% by weight, based on the total weight of all components charged to the reactor. The amount of total polymer control agent may be employed in any amount ranging between any combination of these lower and upper values.

In addition, the polymer polyol and the process of preparing the polymer polyol may optionally comprise a chain transfer agent. The use of chain transfer agents and their nature is known in the art. Examples of suitable materials include compounds such as mercaptans including, e.g. dodecane thiol, ethane thiol, octane thiol, toluene thiol, etc., halogenated hydrocarbons such as, e.g. carbon tetrachloride, carbon tetrabromide, chloroform, etc., amines such as diethylamine, enol-ethers, etc. If used at all in the present invention, a chain transfer agent is used in an amount of from about 0.1 to about 2 wt. %, or from about 0.2 to about 1 wt. %, based on the total weight of the polymer polyol (prior to stripping).

In one embodiment, the polymer polyols herein have a viscosity$\leq V_b e^{4.2x}$ at 25° C., wherein:

Vb=the viscosity of the base polyol in millipascal.seconds (mPa.s); and

X=weight % of solids in the polymer polyol/(100−weight % of solids in the polymer polyol).

The polymer polyols herein are preferably produced by utilizing a low monomer to polyol ratio which is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

The temperature range is not critical and may vary from about 80° C. to about 150° or perhaps greater, or from about 90° C. to about 140° C., or from about 100° C. to about 135° C., or from about 110° C. to about 130° C. As has been noted herein, the catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.-a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The polymer polyols of the present invention comprise dispersions in which the polymer particles (the same being either individual particles or agglomerates of individual particles) are relatively small in size and, in the preferred embodiment, have a weight average size less than about ten microns. However, when high contents of styrene are used, the particles will tend to be larger; but the resulting polymer polyols are highly useful, particularly where the end use application requires as little scorch as possible.

In accordance with the present invention, all of the product (viz. 100%) will pass through the filter employed in the 150 mesh filtration hindrance (filterability) test with low polymer residue (typically <5 ppm), and/or an exceptionally high amount of the product will pass through a 700 mesh screen within 600 seconds. Thus, typically at least 99% of the polymer polyols of the invention will pass through a 700 mesh screen, or at least 100% of the polymer polyols of the invention will pass through a 700 mesh screen. In one embodiment of the invention, 100% of the polymer polyol product should pass through the 700 mesh screen within 600 seconds. The 150 mesh filtration and 700 mesh filtration tests are described in U.S. Pat. No. 5,196,476, the disclosure of which is herein incorporated by reference.

In accordance with the present invention, foams may be prepared from the novel polymer polyols described herein. These foams comprise the reaction product of a polyisocyanate, with an isocyanate-reactive component comprising the novel polymer polyols described herein, optionally, in the presence of a blowing agent, a catalyst and a surfactant. In addition, crosslinking agents, chain extenders, surfactants, and other additives and auxiliary agents which are known to be useful in preparing foams may also be present.

The process of preparing the foams comprises reacting a polyisocyanate component, with an isocyanate-reactive component comprising the novel polymer polyols described herein, in the presence of a blowing agent and at least one catalyst. In addition, crosslinking agents, chain extenders, surfactants, and other additives and auxiliary agents may also be present.

Suitable polyisocyanates comprise those known in the art, particularly aromatic polyisocyanates such as, for example, toluene diisocyanate, diphenylmethane diisocyanate, etc. These are known in the field of polyurethane chemistry.

The isocyanate-reactive component for preparing the polyurethane foams comprises the novel polymer polyols described herein. It is also possible that the isocyanate-reactive component comprises (1) the above described novel polymer polyols and (2) a conventional isocyanate-reactive component such as, for example, a polyoxyalkylene polyol, a polyether polyol, a polyester polyol, etc. Lower molecular weight isocyanate-reactive components such as crosslinkers and/or chain extenders may also be present.

Suitable blowing agents for the present invention include, for example chemical blowing agents, i.e. isocyanate reactive agents that generate blowing gases, such as for example water and formic acid and physical blowing agents such as carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal. These physical blowing agents are usually added to the polyol component of the system. However, they can also be added in the isocyanate component or as a combination of both the polyol component and the isocyanate component. It is also possible to use them together with highly fluorinated and/or perfluorinated hydrocarbons, in the form of an emulsion of the polyol component. If emulsifiers are used, they are usually oligomeric acrylates which contain polyoxyalkylene and fluoroalkane radicals bonded as side groups and have a fluorine content of from about 5 to 30% by weight. Such products are sufficiently well known from plastics chemistry, e.g. EP-A-0351614. Water is the preferred blowing agent.

The amount of blowing agent or blowing agent mixture used is from 0.5 to 20%, or from 0.75 to 10% by weight, based in each case on the total weight of the isocyanate-reactive component. When water is the blowing agent, it is typically present in an amount of from 0.5 to 10%, or from 0.75 to 7% by weight, based on the total weight of the isocyanate-reactive component. The addition of water can be effected in combination with the use of the other blowing agents described.

Surfactants are preferably used to prepare the foams. Surfactants are known help to stabilize the foam until it cures. Suitable surfactants for the invention are those well known in the polyurethane industry. A wide variety of organosilicone surfactants are commercially available. Examples of suitable surfactants include DC-5043, DC-5164 and DC-5169, as well as Niax L-620, a product of Momentive Performance Materials, and Tegostab B8244, a product of Evonik-Goldschmidt. Many other silicone surfactants known to those in the art may be substituted for these suitable silicones. The surfactant is typically used in an amount within the range of about 0.1 to 4, or from about 0.2 to 3, parts per 100 parts of isocyanate-reactive mixture.

At least one polyurethane catalyst is required to catalyze the reactions of the monol, polyols and water with the polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Suitable organoamine catalysts are tertiary amines such as trimethylamine, triethylamine, triethylenediamine, bis(2,2'-dimethylamino)ethyl ether, N-ethylmorpholine, diethylenetriamine, and the like. Preferred catalysts are amine catalysts such as, for example, bis(dimethylaminoethyl)ether in dipropylene glycol and triethylene diamine in dipropylene glycol. These are commercially available as Niax A-1 and Niax A-33, respectively.

The polyurethane catalysts are typically used in an amount within the range of about 0.05 to about 3 parts, or from about 0.1 to about 2 parts, per 100 parts of isocyanate-reactive mixture.

Other optional components that may be present in the foam formulations include, for example, flame retardants, antioxidants, pigments, dyes, liquid and solid fillers, etc. Such commercial additives are included in the foams in conventional amounts when used.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the examples.

Polyol A: An propylene oxide adduct of ethylenediamine with a hydroxyl number of 630 and a 18,000 mPa.s viscosity Polyol B: An propylene oxide adduct of monoethanolamine with a hydroxyl number of 150 and a 250 mPa.s viscosity Polyol C: A propylene oxide adduct of ortho-toluenediamine containing 27% ethylene oxide with a hydroxyl number of 395 and a viscosity of 8800 mPa.s Polyol D: A propylene oxide adduct of glycerine with a hydroxyl number of 238 and a 265 mPa.s viscosity Polyol E: A propylene oxide adduct of sorbitol containing an 8% ethylene oxide cap with a hydroxyl number of 28 and a viscosity of 2500 mPa.s Polyol F: A propylene oxide adduct of sorbitol containing a 16% ethylene oxide cap with a hydroxyl number of 28 and a viscosity of 1700 mPa.s Polyol G: a propylene oxide adduct of ethylenediamine with a hydroxyl number of 60 and a viscosity of 675 mPa.s PCA: Isopropanol, a polymer control agent TMI: Isopropenyl dimethyl benzyl isocyanate (an unsaturated aliphatic isocyanate) sold as TMI® by Allnex MDI: A monomeric MDI comprising about 42% by weight of the 4,4'-isomer of MDI, about 57% by weight of the 2,4'-isomer of MDI and the balance being the 2,2'-isomer of MDI TBPEH: tert-Butylperoxy-2-ethylhexanoate AIBN: 2,2'-Azobisisobutyronitrile, a free-radical polymerization initiator commercially available as VAZO 64 from Chemours Viscosity: Dynamic viscosities measured on an Anton Parr Stabinger viscometer and reported in mPa.s at 25° C.

The macromers were prepared as follows.

Macromer A: Prepared by heating Polyol E (100 g), TMI (2 g), and 100 ppm of CosCat 83 (i.e. bismuth(III) neodecanoate) catalyst at 75° C. for 4 hours.

Macromer B: Prepared by heating Polyol F (100 g), TMI (0.5 g), MDI (0.5 g), and 100 ppm of CosCat 83 catalyst at 75° C. for 4 hours.

Preformed Stabilizer (PFS) Preparation:

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulations are disclosed in Table 1.

TABLE 1

Preformed Stabilizer Compositions

| Component | PFS A | PFS B |
|---|---|---|
| PCA type | Isopropanol | Isopropanol |
| PCA concentration in feed, wt. % | 60.0% | 60.0% |
| Macromer | Macromer A | Macromer B |
| Macromer concentration in feed, wt. % | 24.0% | 24.0% |
| Monomer concentration in feed, wt. % | 15.9% | 15.9% |
| Styrene/acrylonitrile ratio in feed, wt. % | 50:50 | 50:50 |
| TBPEH concentration, wt. % | 0.1% | 0.1% |

Polymer Polyol Preparation:

This series of examples relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±5° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt. % total polymer in the product was calculated from the concentrations of monomers measured in the crude polymer polyol before stripping.

TABLE 2

Polymer Polyols A-D:

| | PMPO A | PMPO B | PMPO C | PMPO D |
|---|---|---|---|---|
| Base Polyol | A/G (40/60) | A/G (60/40) | B | C/D (75/25) |
| Base Polyol Viscosity, mPa · s | 1738 | 3193 | 250 | 2977 |
| Base Polyol (wt. % in feed) | 46.90 | 46.90 | 46.90 | 70.30 |
| PFS | A | A | A | B |
| PFS (wt. % in feed) | 12.50 | 12.50 | 12.50 | 12.50 |
| Styrene (wt. % in feed) | 25.68 | 25.68 | 25.68 | 10.23 |
| Acrylonitrile (wt. % in feed) | 14.60 | 14.60 | 14.60 | 6.66 |
| Catalyst (wt. % AIBN in feed) | 0.32 | 0.32 | 0.32 | 0.32 |
| PCA (wt % in feed) | 7.5 | 7.5 | 7.5 | 7.5 |
| Total Solids (%) | 27.0 | 26.0 | 28.4 | 18.0 |
| Viscosity mPa · s @ 25° C. | 5652 | 12930 | 921 | 6636 |
| Filterability-700 mesh (sec) | 225 | 209 | 175 | 187 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane foam comprising the reaction product of:
   (1) a polyisocyanate component, with
   (2) an isocyanate-reactive component comprising a polymer polyol having a solids content greater than about 15% by weight and less than 30% by weight, based on the total weight of the polymer polyol, and comprising the free-radical polymerization product of:
   (a) one or more base polyols comprising at least one of
      (I) a blend comprising
         (1) one or more amine initiated polyols wherein the amine initiator is free of tertiary amine groups and said amine initiated polyols have an equivalent weight of less than 500,
         and
         (2) one or more hydroxyl initiated polyols having a functionality of from about 2 to about 6 and a hydroxyl number of from about 10 to about 1000, wherein said hydroxyl initiated polyols are selected from the group consisting of polyether polyols, polyester polyols, polyetherester polyols and mixtures thereof;
         or
      (II) one or more amine initiated polyols wherein the amine initiator comprises an alkanolamine and is free of tertiary amine groups, and said amine initiated polyols have an equivalent weight of less than 500;
   (b) at least one preformed stabilizer further comprising a polymer control agent; and
   (c) one or more ethylenically unsaturated monomers; combined in the presence of
   (d) at least one free radical polymerization catalyst; and in the absence of
   (e) additional polymer control agent which is added separately from the preformed stabilizer;
   in the presence of
   (3) one or more catalysts,
   (4) one or more blowing agents, and
   (5) one or more surfactants.

2. The polyurethane foam of claim 1, wherein the polymer polyol has a viscosity $<V_b e^{4.2x}$ wherein:
   $V_b$=viscosity of the base polyol in millipascal.second (mPa.s); and
   X=the weight % of solids in the polymer polyol/(100−the weight % of solids in the polymer polyol).

3. The polyurethane foam of claim 1, wherein the ethylenically unsaturated monomers comprise styrene and acrylonitrile.

4. The polyurethane foam of claim 1, wherein the one or more amine initiated polyols have a functionality of about 2 to about 8 and an equivalent weight ranging from about 75 to about 400.

5. The polyurethane foam of claim 3, wherein styrene and acrylonitrile are present in a weight ratio of from 80:20 to 20:80.

6. The polyurethane foam of claim 1, wherein the free radical polymerization catalyst is selected from the group consisting of peroxides, azo compounds and mixtures thereof.

7. The polyurethane foam of claim 1, wherein the preformed stabilizer comprises the reaction product of (i) a macromer, (ii) at least one ethylenically unsaturated monomer, (iii) a polymer control agent, and (iv) a free radical polymerization initiator.

* * * * *